Nov. 19, 1929.  C. M. LUCK  1,736,450
TRACTOR TRAILER
Filed April 26, 1927   2 Sheets-Sheet 2
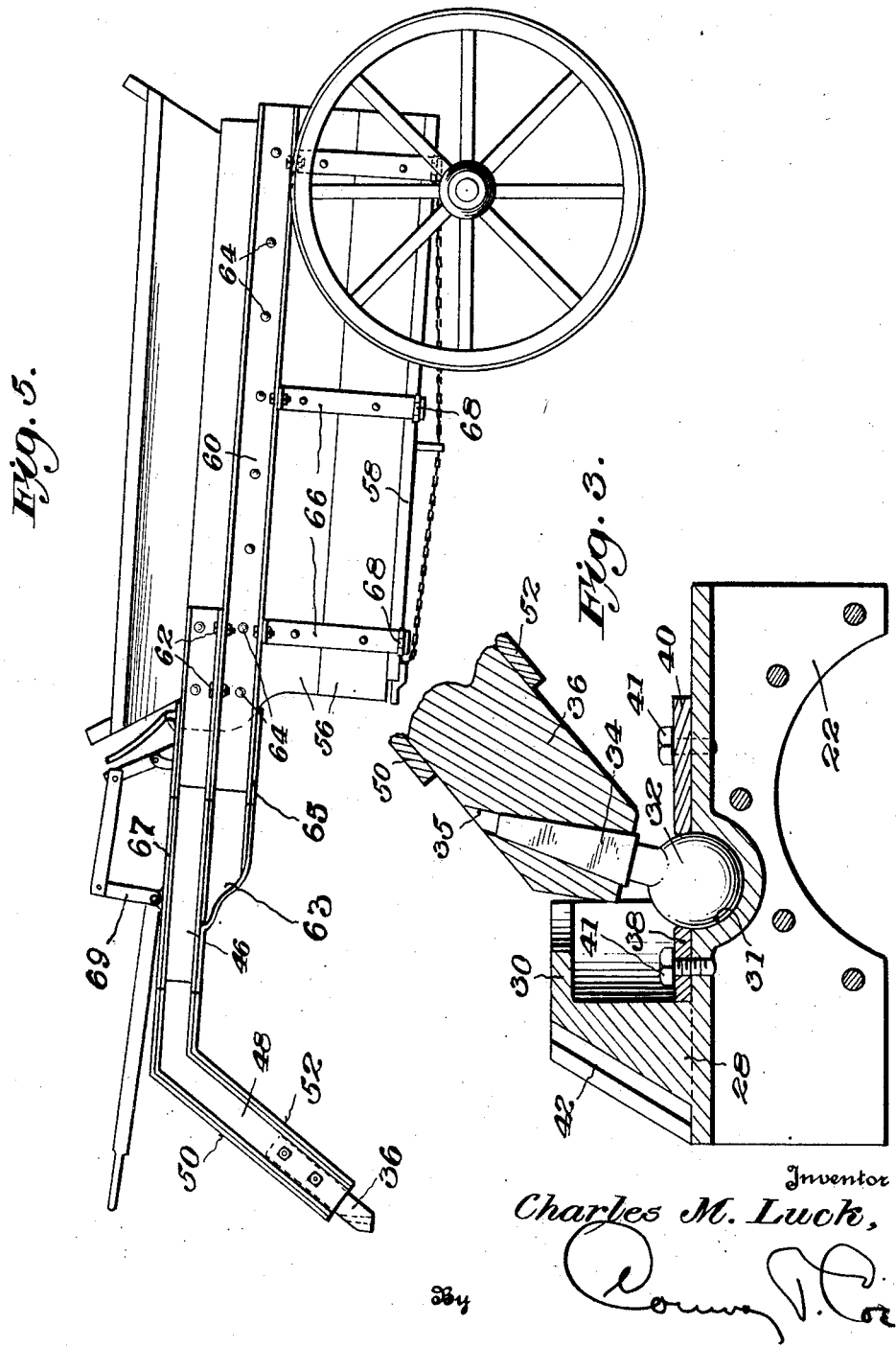

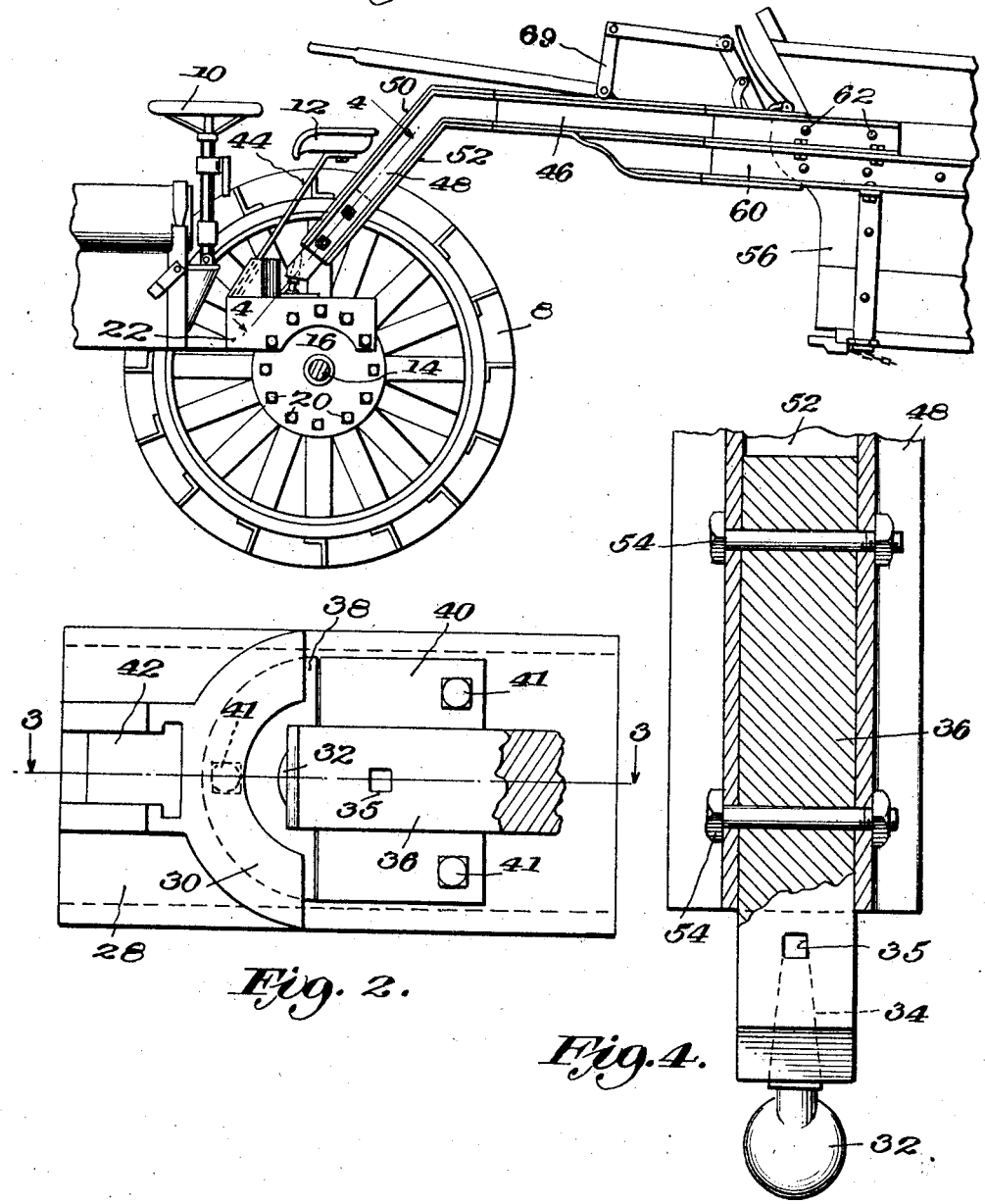

Patented Nov. 19, 1929

1,736,450

UNITED STATES PATENT OFFICE

CHARLES MERLE LUCK, OF RICHMOND, VIRGINIA

TRACTOR TRAILER

Application filed April 26, 1927. Serial No. 186,715.

This application is a continuation in part of my applications S. N. 35,778 (which matured into Patent #1,602,852) and S. N. 35,779 both filed June 8, 1925. The object of the present invention is to improve the structure disclosed in the aforementioned applications, particularly as regards the universal connection between the tractor and the trailer, and whereby the construction of said connection is simplified and made quickly detachable.

A further object of the invention is to improve the construction of certain parts of the trailer for greater simplicity and strength.

A further object of the invention is to improve the manner of suspending the doors from the trailer frame.

A further object is to provide an improved seat mounting on the tractor.

These and other objects of the invention will appear more fully from the description, when read in connection with the drawings, in which Fig. 1 is a fragmentary view of a tractor-trailer vehicle embodying the invention, Fig. 2 is an enlarged plan view of the universal connection, Fig. 3 is a longitudinal section of the same, Fig. 4 is a section taken on the line 4—4 of Fig. 1, and Fig. 5 is a side elevation of the trailer.

The tractor illustrated is of the Fordson type, certain parts being modified as hereinafter pointed out, and comprises drive wheels 8, a steering wheel 10, and a driver's seat 12 in operative proximity to the steering wheel. The drive wheels are mounted on an axle 14, which is enclosed in the usual housing 16, secured to the frame of the tractor by bolts 20. A bridge 22 is secured to the housing 16 and is provided with a projection or lug 28 having a rearwardly extending flange 30 upon the upper end thereof.

The bridge is formed with a socket 31 which is adapted to receive a ball 32 to form a universal joint between the tractor and trailer. The ball 32 is provided with a tapered shank 34 which is seated in a substantially vertical aperture 35 in block 36 of the trailer frame. The ball is held in its socket by means of plates 38 and 40 which are secured to the bridge 22 by bolts 41.

At its forward face, the lug 28 is provided with an inclined slot 42 which receives the spring plate 44 of the seat 12. The plate fits snugly in the slot but is not secured therein, so that the seat can be removed by simply lifting it out of its engagement with the slot.

The general structure of the trailer frame is the same as that disclosed in U. S. Patent #1,602,852, except as hereinafter pointed out. The converging channel beams 46 are, at their forward ends, bent downwardly and are provided with cover plates 50 and 52, to thereby form an inclined hollow reach 48. Within this reach is seated the block 36, it being detachably secured in place by bolts 54.

Block 36, as pointed out above, receives shank 34, the two being held together merely by friction and by the weight of the trailer, so that the trailer can at any time be disconnected from the tractor by lifting the reach 48, using jacks or other suitable means, while tapping the upper end of shank 34. In order to facilitate this operation, the tractor seat is made quickly removable as explained above.

The trailer comprises a body or dump box 56 having doors 58 adapted when released to discharge the load. Extending longitudinally on each side of the body is a channel beam 60, which beams are secured to channels 46 by means of bolts 62 or other suitable means such as riveting or welding, and converge at their forward ends and are secured together at 63. A plate 65 is secured to the lower flanges of beams 60 and 46 to increase the strength of the connection between the two pairs of beams, and an upper plate 67 is secured to the upper flanges of beam 46 to further strengthen this connection and to form a support for dump-operating mechanism 69. Beams 60 are secured to the body by bolts 64, the two channel beams cooperating to form a truss of ample strength to support the load and sustain the severe impact stresses to which such vehicles are subjected.

Extending vertically on each side of the trailer body are straps 66 which are secured to the beams 60 and also to the side walls of the body. Their purpose is to reinforce the said side walls and also to carry the doors 58, which are hinged thereto as shown at 68. By this arrangement, the weight of the doors and of the material piled thereon is transmitted to the beams 60, which are well able to sustain it, rather than being carried by the body of the trailer, which would be racked and deformed thereby.

The device of the present invention is designed for the most severe usage, and may, even while loaded, be driven over very rough and sloping ground with a minimum degree of danger to the vehicle and its driver. The universal joint provides for relative turning and tilting between the tractor and the trailer. In order to minimize the tendency of the tractor to overturn backwardly over its drive wheels, the universal joint is placed forward of the axle 14, while the flange 30 is adapted to bear against the reach 48 to prevent such overturning.

In case either the trailer or the tractor overturns, the overturning of the one will not cause the overturning of the other, and the two may be quickly detached to permit righting of the overturned member.

Having described my invention, what I claim as new and desire to secure by Letters Patent of the United States is:

1. A connection between a tractor and a reach attached to a trailer comprising a socket member secured to the tractor, a flange in fixed relation to said socket member and in front of and above said socket member, a ball member secured in said socket member for universal movement therein, and an extension on said ball member in engagement with said reach, said flange being adapted to engage said reach to limit movement of said reach in a vertical plane with respect to said tractor.

2. A connection between a tractor and a reach attached to a trailer comprising a socket member secured to the tractor, a flange in fixed relation to said socket member and in front of and above said socket member, a ball member secured in said socket member for universal movement therein, and an extension on said ball member in engagement with said reach, said flange being formed in the arc of a circle having its center substantially in a vertical line through the center of said ball member, and being adapted to engage said reach to limit movement of said reach in a vertical plane with respect to said tractor.

In testimony whereof I affix my signature.

CHARLES MERLE LUCK.